Jan. 8, 1957 G. J. LAEMMLE, JR 2,776,972
RECOVERY OF MORPHOLINE FROM AQUEOUS SOLUTIONS THEREOF
Filed Sept. 27, 1954
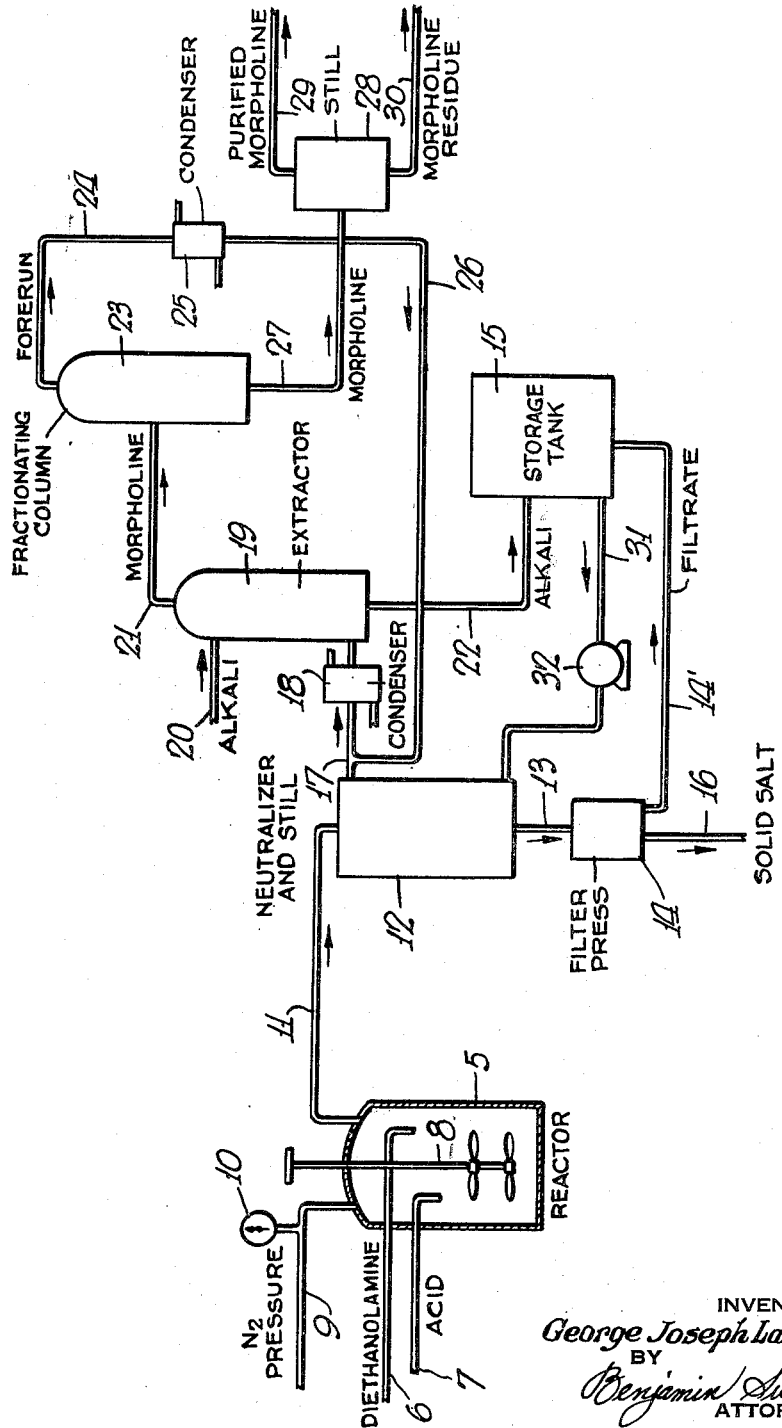
INVENTOR
George Joseph Laemmle Jr
BY
Benjamin Sweedler
ATTORNEY

United States Patent Office 2,776,972
Patented Jan. 8, 1957

2,776,972
RECOVERY OF MORPHOLINE FROM AQUEOUS SOLUTIONS THEREOF

George Joseph Laemmle, Jr., Austin, Tex., assignor to Jefferson Chemical Company, Inc., New York, N. Y., a corporation of Delaware Application September 27, 1954, Serial No. 458,686

6 Claims. (Cl. 260—247)

This invention relates to the recovery of morpholine from aqueous solutions containing morpholine.

In the preparation of morpholine by the dehydration of diethanolamine with sulfuric acid or hydrochloric acid a reaction mixture is obtained which contains the morpholine as an acid salt dissolved in excess aqueous acid. The morpholine is commonly separated from the reaction mixture by steam distillation after addition of alkali in amount sufficient to render the mixture strongly alkaline. The morpholine is thereby obtained as an aqueous solution, the concentration of which may vary within wide limits, e. g., from 5% to 50% by weight, depending upon the quantity and concentration of excess alkali present during the steam distillation.

In recovering the morpholine in substantially pure form from the aqueous solution obtained by distillation in this manner, the heretofore common practice involved conversion of the morpholine to the hydrochloride, removal of the water and excess hydrochloric acid by evaporation, regeneration of the free base by treatment of the salt with concentrated alkali, extraction of the resultant base from the reaction mixture with a water-immiscible, low-boiling solvent such as ether, drying the extract and thereafter distilling it to recover the solvent and a morpholine fraction. Such procedure has a number of objections, among which may be mentioned (a) the large number of processing steps required renders the process costly ot carry out, (b) extraction of the regenerated base is complicated by the presence of undissolved salt which tends to prevent satisfactory separation of the extract and alkali phases, and (c) yields are usually low, often less than 50% of theoretical.

It is an object of this invention to provide a process of recovering morpholine from such aqueous solutions, which process involves relatively few steps and is therefore simple and economical to carry out and results in substantially quantitative recoveries of the morpholine.

Other objects and advantages of this invention will be apparent from the following detailed description thereof.

In accordance with this invention the aqueous morpholine solution is extracted with a concentrated alkali metal hydroxide in amount sufficient to produce two phases, one containing negligible quantities of morpholine but containing at least 30% by weight of alkali metal hydroxide, and the other containing substantially all of the morpholine in the form of a concentrated solution, say containing 75% to 99% morpholine. It has been found that the morpholine can be separated almost quantitatively from dilute aqueous solutions by extraction with a moderate quantity of concentrated alkali metal hydroxide producing a concentrated aqueous solution of morpholine containing substantially all of the morpholine and a dilute alkali solution. The dilute alkali solution may be combined with the acid reaction product to produce the alkaline mixture from which the aqueous solution of morpholine is recovered by distillation. The concentrated aqueous solution of morpholine may be dewatered, for example, by distillation in a fractionating column, and pure morpholine recovered from the anhydrous residue by distillation of the latter.

The condensate produced in the de-watering treatment, which condensate contains water and morpholine, desirably from 90% to 95% by weight of morpholine, is returned to the process by mixing it with incoming or additional aqueous morpholine solution prior to extraction with concentrated alkali metal hydroxide, as hereinabove described. In this way, loss of morpholine is minimized.

The alkali metal hydroxide admixed with the aqueous morpholine solution may be sodium or potassium hydroxide in solid form, or preferably as a strong aqueous solution. For reasons of economy and ready availability sodium hydroxide is preferred and is used in the form of a solution of from 40% to 75% by weight concentration. The amount of alkali metal hydroxide mixed with the morpholine solution is from 0.5 to 5 parts by weight, preferably 2 to 4 parts of the alkali metal hydroxide of 40% to 75% by weight concentration per part of aqueous morpholine solution containing from 5% to 50% by weight of morpholine. The exact amount of alkali metal hydroxide used within this range will depend on the concentration of the alkali metal hydroxide and of the aqueous morpholine solution with which it is admixed and should be so chosen as to result in a morpholine phase containing about 75% morpholine, preferably from 79% to 98% morpholine, these values being determined at 50°–60° C.

It will be understood that the aqueous morpholine solution may be treated with concentrated alkali metal hydroxide as hereinabove described, either batch-wise or continuously, preferably in a continuous manner. Operating continuously, the dilute aqueous morpholine solution is fed into the base of an extraction tower and flows upwardly countercurrent to a descending stream of alkali metal hydroxide, and overflows at the top as a concentrated morpholine solution having a concentration of morpholine of from 75% to 98% by weight, preferably about 98%. Operating batchwise, the dilute aqueous morpholine solution and the alkali metal hydroxide are mixed and permitted to settle, producing an upper layer or phase containing from 75% to 98% morpholine, and a lower layer or phase containing at least 30% by weight of alkali metal hydroxide, preferably from 33% to 60%, these values being determined at 50°–60° C. If desired, the dilute aqueous morpholine solution may be extracted in a plurality of stages, in which the aqueous morpholine and the alkali metal hydroxide are passed in countercurrent flow through a number of extraction stages, each of which may be batch or continuous, as hereinabove described.

The extraction may be carried out under any conditions of temperature and pressure at which the morpholine and the alkali metal hydroxide are liquid. Hence when using concentrated alkali metal hydroxide of, say, 75% concentration, which freezes at about 135° F., the extraction should be carried out at a temperature above atmospheric. During the extraction the temperature tends to rise considerably above feed temperature, because of the heat generated due to dilution of the alkali. In order to eliminate the necessity of cooling the dilute aqueous morpholine solution as it comes from the still, in which it is distilled off from the neutralized reaction mixture, and to conserve heat, the extraction is preferably carried out at a temperature of about 125° C. and a pressure of about 50 p. s. i. g. In this way, the concentrated morpholine solution may be fed from the extractor directly into the still for effecting its dewatering, with saving in the heat required for effecting the de-watering.

The accompanying drawing is a flow diagram of a process embodying this invention; it will be understood the invention is not limited to this embodiment.

In the drawing, 5 indicates a reactor which is provided with a diethanolamine feed line 6, an acid supply line 7, an agitator 8 and a nitrogen supply line 9, equipped with a pressure meter 10. The reaction between the diethanolamine and the acid, which may be either sulfuric or hydrochloric, may take place in this reactor in any well known manner to produce morpholine as an acid salt dissolved in excess aqueous acid. This reactor communicates by means of a pipe line 11 with a neutralizer and still 12 equipped with an alkali metal salt slurry line 13 leading to a filter press 14. Aqueous alkali metal filtrate from this filter press flows through a line 14′ into alkali storage tank 15. Solid salt removed in the filter press may be removed through line 16. A line 17 containing a condenser 18 connects the neutralizer and still 12 with an extractor 19. This extractor is provided with an alkali supply line 20, a line 21 for withdrawal of the concentrated solution of morpholine and a line 22 for the withdrawal of the dilute alkali solution. Line 22 communicates with the storage tank 15.

Line 21 communicates with a fractionating column 23 in which the concentrated morpholine solution from the extractor 19 is de-watered. The forerun fraction containing substantially all of the water and a substantial amount of morpholine passes through lines 24 into a condenser 25; the condensate from this condenser flows through line 26 which communicates with line 17 leading to the extractor 19. The residual morpholine flows from the fractionating column 23 through a line 27 into a purifying still 28 where the morpholine may be distilled to produce pure morpholine which is taken off through line 29 and a morpholine residue taken off through line 30. The morpholine residue may be distilled separately or stored for use as a low grade morpholine product.

Storage tank 15, as above noted, may receive the dilute alkali from the extractor 19 and also from filter 14. This dilute alkali may be pumped through line 31 by a pump 32 into the neutralizer and still 12 and is employed for the purpose of neutralizing the crude morpholine reaction product produced in reactor 5. By following this practice morpholine dissolved in the dilute aqueous alkali solution produced in the extractor is recycled and thus returned to the process.

The process is exemplified by the following examples of the continuous production of morpholine from diethanolamine by dehydration with sulfuric acid. It will be understood, however, that the invention is not limited to these examples, that other strengths of sulfuric acid as well as hydrochloric acid may be used as the dehydration medium, that other feed rates, concentrations or quantities of acid may be used, that the caustic may be introduced into the process as a solid or in solution of desired concentration, and that instead of carrying out the process continuously it may be carried out batch-wise. In these examples all amounts are given on an hourly basis.

Example I 189 pounds of 96.5% sulfuric acid and 105 pounds of diethalnolamine are supplied to the reactor 5 maintained at a temperature of from 170° to 175° C. and in which the reaction mixture is continuously agitated. 294 pounds of reaction mixture are withdrawn through line 11 and discharged into the neutralizer and still 12. 825 pounds of 30% sodium hydroxide are introduced into the neutralizer and still 12 through line 31. 702 pounds of a sodium sulfate and caustic slurry are discharged to waste from neutralizer and still 12 through line 13. (In this example the filter press 14 is not used.)

417 pounds of crude aqueous morpholine are distilled overhead, condensed, and introduced as liquid into the extractor 19. 495 pounds of a 50% solution of sodium hydroxide are introduced into the extractor through line 20. In this extractor the resultant mixture separates into an upper phase containing 83% morpholine and a lower phase containing 30% caustic, substantially all of the morpholine being in the upper phase. 112 pounds of 83% morpholine solution are withdrawn through line 21 and introduced into the fractionating column 23 where it is distilled. 25 pounds of aqueous morpholine forerun are passed through line 24, condenser 25, the condensate flowing into extractor 19 through lines 26 and 17. 825 pounds of approximately 30% caustic are withdrawn from the extractor 19 and introduced into the storage tank 15. As above noted, 825 pounds of this mixture containing approximately 30% sodium hydroxide are pumped by pump 32 into the neutralizer and still 12 to effect neutralization of the reaction mixture introduced thereinto from the reactor 5.

About 86 pounds of anhydrous crude morpholine flows from fractionating column 23 into still 28 where it is fractionated. About 79 pounds are removed through line 29 as pure morpholine and about 7 pounds through line 30 as morpholine residue.

The yield of morpholine thus obtained is about 88% based on the diethanolamine used.

Example II 157 parts of commercial diethanolamine containing 96% by weight of diethanolamine and 262 parts of 20% oleum are separately introduced into a glass-lined reaction kettle 5, equipped with an agitator 8 and maintained under a nitrogen pressure of about 2 p. s. i. g. The reaction temperature is maintained at about 190°–210° C., and the average residence time in the reactor is one hour.

The reacted mixture flows through a dip-tube 11 under the slight nitrogen pressure into a neutralizer and still 12, where it is treated with 761 parts of 40% sodium hydroxide. Vapors from the neutralizer are condensed, yielding about 484 parts of approximately 27% aqueous crude morpholine. About 633 parts of sodium hydroxide-sodium sulfate slurry are withdrawn from the bottoms of the neutralizer and still 12 and passed to a filter press 14. From this filter press about 296 parts of 40% sodium hydroxide are recovered and passed to a caustic storage tank 15 for eventual return to the neutralizer and still 12 for neutralization of additional acid mixture. 337 parts of salt cake are recovered from the filter press 14 as a saleable by-product.

The condensed overhead from the neutralizer and still 12, consisting of about 474 parts of approximately 27% morpholine, is combined with a recycle stream of morpholine forerun from the fractionating column 23 (amounting to about 33 parts of 91% crude aqueous morpholine) and is introduced into the base of a packed extraction tower 19 where it flows countercurrently to a descending stream of about 255 parts of 73% NaOH. 162 parts of approximately 98% crude morpholine is recovered from the top of the extractor, and about 610 parts of 30%–31% sodium hydroxide is removed from the base. This extraction tower is operated at a temperature of about 125° C. and a pressure of about 50 pounds above atmospheric.

The diluted sodium hydroxide removed from the base of the extraction tower 19 is passed to an evaporator where it is reconcentrated to about 40% strength, and from which it is sent to 40% caustic storage for eventual use in the neutralizer and still 12.

The 98% crude morpholine passes from the extractor 19 into a stripping column 23 from which, as previously stated, about 33 parts per hour of 91% crude morpholine is taken overhead and returned to the extractor 19. About 129 parts of substantially anhydrous crude morpholine are removed as a bottoms product from the fractionating column 23 and conducted to a morpholine product still 28 from which about 111 parts of approximately 99.8% morpholine is taken overhead and about 18 parts of a residue consisting of morpholine and higherboiling related bases is recovered. The yield of purified morpholine is thus about 89% based on the amount of diethanolamine actually fed to the process.

It will be noted that this invention provides a process of recovering morpholine from dilute aqueous solutions containing morpholine, which process involves relatively few steps and is therefore simple and economical to carry out, and results in substantially quantitative recoveries of the morpholine.

By following the above conditions of treatment of the aqueous morpholine solution the spent alkali-metal salt slurry is produced in a freely flowable form so that it can be disposed of readily; a minimum excess of the alkali metal hydroxide is employed in the process, and maximum yields of morpholine are obtained.

The process of this invention is superior to the direct fractionation of the aqueous morpholine solution since the load to the fractionating column is greatly reduced without the use of additional materials or operating steps. Thus, for instance, utilizing a direct fractionation procedure and operating with quantities of crude morpholine involved in Example 1 a column capable of removing about 330 pounds of water per hour overhead is required. Example 1, on the other hand, requires fractionation of no more than about 20 pounds of water per hour overhead. Hence this invention results in a material saving in the size of the distillation equipment and the cost of operating the same including the heat input requirements. Moreover, in any direct fractionation procedure morpholine carried with the water is lost; because of the large volume of diluent water it is not feasible to recycle the water. In the process of the present invention on the other hand the aqueous overhead produced in the fractionating column 23 can be recycled efficiently; to avoid loss of morpholine in the aqueous forerun fraction removed from column 23, this fraction is returned to the process by being fed to the neutralizer and still or to the extractor 19, preferably the latter.

When treating a morpholine solution produced from a diethanolamine containing monoethanolamine as an impurity, it is preferred to pass the overhead from the neutralizer and still 12 to a fractionating column operated to remove overhead a small amount of water vapor and thus remove any ethylene imine which may be present. Ethylene imine is a poisonous material which is formed under the conditions employed in producing morpholine, when the diethanolamine contains monoethanolamine. By operating as hereinabove described the ethylene imine is prevented from passing into the extractor and the morpholine purification stills.

It is to be understood that this invention is not restricted to the present disclosure otherwise than as defined by the appended claims.

What is claimed is:

1. The process of recovering morpholine from a dilute aqueous morpholine solution, which comprises mixing said solution with alkali metal hydroxide and thus producing two phases, one containing substantially all of the morpholine and the other consisting of a relatively dilute alkaline solution, separating the two phases and treating the morpholine phase to recover the morpholine therefrom.

2. The process of recovering morpholine from a dilute aqueous morpholine solution, which comprises mixing said solution with alkali metal hydroxide having a concentration of at least 40% by weight of alkali metal hydroxide in amount sufficient to produce two phases, one containing substantially all of the morpholine and the other consisting of a dilute alkaline solution, separating the two phases and treating the morpholine phase to recover the morpholine therefrom.

3. The process of recovering morpholine from a dilute aqueous morpholine solution produced by neutralizing with alkali an acid reaction mixture containing morpholine and distilling the neutralized mixture to produce a dilute aqueous morpholine solution, which process comprises treating said dilute aqueous morpholine solution with alkali metal hydroxide having a concentration of at least 40% to produce a concentrated morpholine solution containing from 75% to 98% morpholine and an alkaline solution containing from 33% to 60% alkali metal hydroxide, separating the said concentrated morpholine solution from the said alkaline solution, utilizing the alkaline solution to neutralize the acid reaction mixture subjected to distillation to produce said dilute aqueous morpholine solution, and treating the concentrated morpholine solution to recover the morpholine therefrom.

4. A process of producing morpholine, which comprises the following steps: step 1, reacting diethanolamine with sulfuric acid to produce morpholine sulfate; step 2, neutralizing the solution formed in step 1 with alkali metal hydroxide and distilling the neutralized mixture to produce a dilute aqueous morpholine solution; step 3, treating the solution from step 2 with alkali metal hydroxide having a concentration of from 40% to 75% alkali metal hydroxide in amount sufficient to produce a concentrated morpholine solution containing from 75% to 99% morpholine and an alkaline solution containing from 33% to 60% alkali metal hydroxide at 50°–60° C; step 4, separating the two solutions produced in step 3 and utilizing the alkaline solution to effect neutralization of the morpholine sulfate from step 2; and step 5, distilling the concentrated morpholine solution from step 3 to recover the morpholine.

5. A process of producing morpholine, which comprises the following steps: step 1, reacting diethanolamine with sulfuric acid to produce morpholine sulfate; step 2, neutralizing the solution formed in step 1 with sodium hydroxide derived from step 4 and distilling the neutralized mixture to produce a dilute aqueous morpholine solution containing from 5% to 50% by weight of morpholine; step 3, treating the solution from step 2 with from 0.5 to 5 parts of sodium hydroxide having a concentration of from 40% to 75% per part of said solution and forming a solution containing substantially all of the morpholine and dilute alkaline solution; step 4, separating the two solutions and employing the dilute alkaline solution in step 2 for neutralizing the said morpholine sulfate; and step 5, distilling the morpholine solution from step 4 to recover the morpholine.

6. A process for concentrating and recovering morpholine from a dilute aqueous solution containing about 5% to 50% by weight of morpholine which comprises adding about 0.5 to 5 parts of an alkali metal hydroxide solution of 40% to 75% concentration to said morpholine solution to form a 2-phase solution consisting of a concentrated morpholine upper phase containing at least about 75% morpholine and a lower alkaline phase, separating said morpholine phase and treating same to recover morpholine therefrom.

References Cited in the file of this patent

UNITED STATES PATENTS 615,488    Knorr _____ Dec. 6, 1898